United States Patent [19]

Strickler

[11] 4,136,750
[45] Jan. 30, 1979

[54] TOP-LOADING BALANCE

[75] Inventor: Ernst Strickler, Wolfhausen, Switzerland

[73] Assignee: Mettler Instrumente AG, Greifensee-Zurich, Switzerland

[21] Appl. No.: 815,147

[22] Filed: Jul. 13, 1977

[30] Foreign Application Priority Data

Dec. 14, 1976 [CH] Switzerland ............. 15690/76

[51] Int. Cl.² ............ G01G 21/22; G01G 23/02
[52] U.S. Cl. ............................ 177/189; 177/156
[58] Field of Search ............ 177/154, 156, 184, 187, 177/189

[56] References Cited

U.S. PATENT DOCUMENTS

| 3,905,433 | 9/1975 | Raynes | 177/184 |
| 3,973,637 | 8/1976 | Kunz | 177/189 |
| 4,058,179 | 11/1977 | Price | 177/187 X |
| 4,084,652 | 4/1978 | Sharp-Dent et al. | 177/189 |

Primary Examiner—George H. Miller, Jr.
Attorney, Agent, or Firm—Hans Berman

[57] ABSTRACT

A single weighing pan of a top-loading balance is mounted on a vertically movable carrier spindle which transmits the weight of the pan and of a load thereon to an electromechanical transducer. Shock damage to the transducer is prevented by two superposed, star-shaped leaf springs connecting the pan to the spindle and jointly with the spindle, constituting a parallelogram linkage which prevents tilting of the pan under an eccentric load.

10 Claims, 3 Drawing Figures

U.S. Patent
Jan. 30, 1979
4,136,750
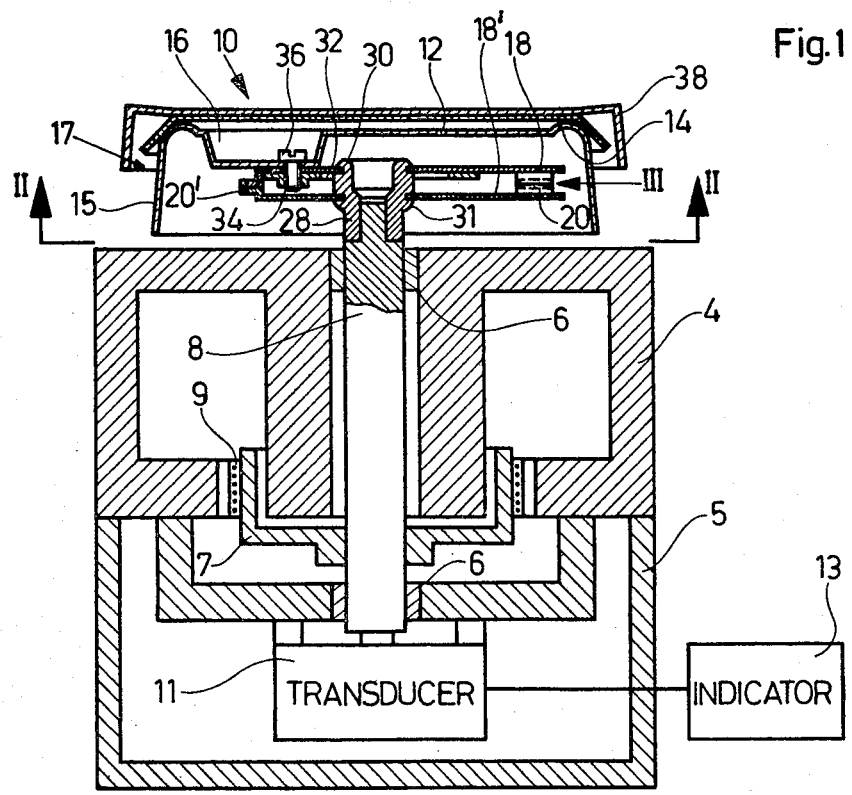
Fig.1
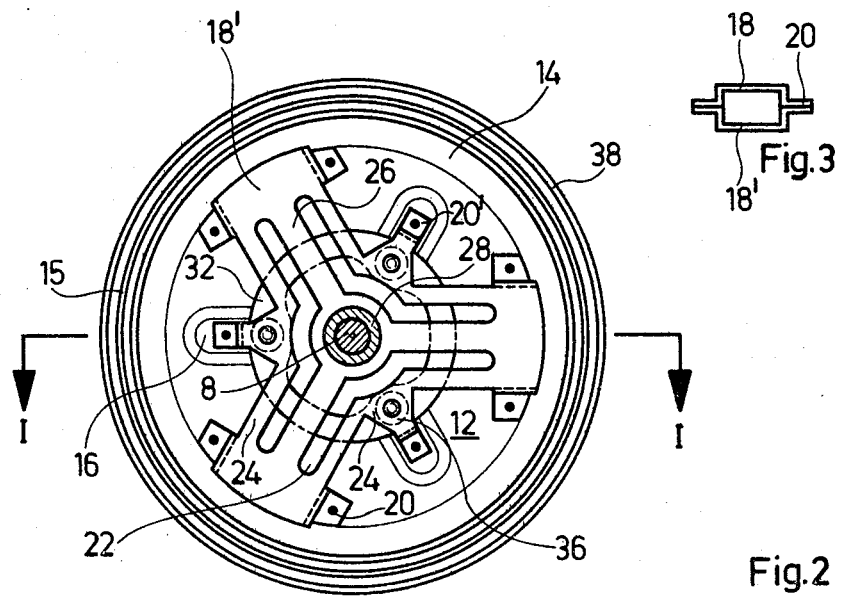
Fig.3
Fig.2

TOP-LOADING BALANCE

This invention relates to top-loading precision balances, and particularly to an improved balance of the type disclosed and claimed in the commonly owned U.S. Pat. No. 3,973,637.

The earlier patent disclosed and claimed weighing apparatus in which a pan carrier spindle is guided on a support for movement in a vertical direction. A force transmitting arrangement operatively interposed between the carrier spindle and the weighing pan of the apparatus transmits the force of gravity acting on the object to be weighed from the pan to the spindle and includes a resilient element yieldable under the force. Cooperating abutments on the pan and the support limit the resilient deformation of the element by the transmitted force. The spindle is connected to an electromechanical transducer which is caused by the transmitted force to generate an electric signal capable of being converted to a perceptible signal by an indicating device. The resilient element of the force transmitting arrangement protects the transducer against shock loading of the pan.

While the device of the earlier patent has been used successfully, it responds differently to the same load when applied at different distances from the center of the weighing pan. When the pan is loaded eccentrically beyond the rated balance capacity, the pan tilts and abuts against the housing. This makes it difficult to adjust the balance for corner loading and makes the protection afforded by the resilient element dependent on the location of an applied load.

The primary object of this invention is the provision of a top-loading balance in which the resilient element provides its protective effect regardless of the point on the pan to which an overload is applied.

With this object and others in view, the invention provides a second resilient element juxtaposed to the afore-mentioned resilient element in the direction of carrier spindle movement. Fastening devices fasten the two elements to each other, the pan carrier, and the weighing pan in such a manner that the fastened elements and either the pan carrier or the weighing pan or both constitute a parallelogram linkage which guides the weighing pan member in the direction of movement of the carrier spindle during the movement of the latter.

Other features, additional objects, and many of the attendant advantages of this invention will readily be appreciated as the same becomes better understood by reference to the following detailed description of a preferred embodiment when considered in connection with the appended drawing in which:

FIG. 1 shows a balance of the invention in elevational section on the line I — I in FIG. 2;

FIG. 2 is a sectional bottom plan view of the balance taken on the line II — II in FIG. 1; and FIG. 3 illustrates resilient elements of the balance as seen in part in the direction of the arrow III in FIG. 1.

Referring initially to FIGS. 1 and 2, there is shown a balance similar to that disclosed in the afore-mentioned earlier patent. Its supporting structure includes a hollow metal base 5 on which a magnet 4 is mounted. Aligned, vertical bearings 6 on the magnet 4 vertically guide a spindle 8 of circular cross-section without significant friction. A cup-shaped former 7 on the spindle 8 carries a force coil 9 movably arranged in an air gap of the magnet 4 so that the spindle 8 is biased toward the illustrated position by the interaction of electric current flowing in the coil 9 and of the field of magnet 4.

The upper end of the spindle 8 projects beyond the magnet 4 and carries a weighing pan assembly 10. The lower end of the pan-carrying spindle engages an electromechanical transducer 11 which senses the vertical position of the spindle 8 and transmits an electric signal to an indicator 13 in response to vertical displacement of the spindle 8, the indicator producing a perceptible signal indicative of the spindle displacement. The balance described so far, the electric circuitry associated therewith, and its operation are well known from Tomes U.S. Pat. No. 3,519,095.

This invention is more specifically concerned with the weighing pan assembly 10 and with its connection to the pan carrying spindle 8. The pan assembly 10 has a base portion 17 of aluminum alloy having the general shape of an inverted, shallow dish circular about the axis of the spindle 8. The steeply frustoconical side wall 15 of the base portion 17 extends downward from the radial bottom wall 12 to within a few millimeters of the horizontal top face of the magnet 4, and the bottom wall 12 bulges upward in a rounded, circular rib 14 from its juncture with the side wall. This much of the weighing pan assembly 10 is common to this invention and to the afore-mentioned U.S. Pat. No. 3,973,637.

Three radial grooves 16 are equiangularly offset about the center of the bottom wall 12 so that corresponding ribs project from the underside of the wall 12. Two identical leaf-springs 18, 18' are vertically juxtaposed under the bottom wall 12. Each spring has a central portion and three wide arm portions radiating equiangularly from the central portion. Two integral lugs 20 project from the peripherally terminal part of each arm portion toward corresponding lugs on the other spring, and the corresponding lugs are spot-welded to each other, as is best seen in FIG. 3.

Each spring 18, 18' has three, approximately V-shaped slots 22 which divide the spring into an inner part 26 and an outer part 24 joined by the imperforate, peripherally terminal parts of the arm portions in such a manner that the outer part 24 envelops the inner part 26 to permit some relative vertical movement of the two parts. The apex portion of the approximate V-shape of each slot is located in the central portion of the spring, and the two legs of the V-shape extend into the arm portions.

The central portions of the springs 18, 18' are fastened to each other and to the spindle 8 by a coupling sleeve 28 coaxially attached to the top of the spindle 8. The central spring portions are secured in circumferential grooves of the sleeve 28 by integral retaining rings 30, 31 formed on the sleeve 28 by peening or upsetting.

A flat annular disc 32 carrying three internally threaded eyes 34 spacedly circles the spindle 8 between the springs 18, 18'. It is partly held in position by three, short, radial lugs 20' on each spring which are welded to corresponding lugs on the other spring adjacent the ring 32 in a radially outward direction. A screw 36 passes through an opening in each rib 16 of the bottom wall 12 and an aligned opening in the central portion of the spring 18 adjacent a lug 20' into an eye 34 of the ring 32.

The cover portion 38 of the weighing pan assembly also has the shape of a shallow, inverted cup and is superposed on the rib 14. Its planar top face receives the load to be weighed.

In an actual embodiment of the invention, the gap between the side wall 15 and the top of the magnet 4 was about 2 millimeters in the absence of a load on the weighing pan. The springs 18, 18' were curved when in the relaxed condition and held under stress by the welded fastenings. They could be deflected about 3 millimeters. The stress in the springs 18, 18' was selected to be about 10% greater than the rated load capacity of the balance so that there was no significant resilient deformation of the springs in normal balance operation. However, the springs, together with the sleeve 28, which is a part of the pan carrier otherwise constituted by the spindle 8, constitute a parallelogram linkage which holds the top face of the cover portion 38 horizontal regardless of the location of the load on its top face.

When an excessive load is placed on the top face of the cover portion 38 or if a load is applied suddenly, as by dropping it on the pan, the springs 18, 18' yield to permit downward movement of the weighing pan assembly 10 until the side wall 15 abuts against the magnet 4. Yet, the direction of pan movement is vertical regardless of any eccentric loading of the pan, and the side wall 15 engages the magnet 4 along its circumference. The shock load is transmitted mainly to the stationary supporting structure of the balance, and the spindle 8 can transmit to the transducer 11 only the relatively minor force corresponding to the strain in the springs 18, 18' and incapable of damaging the transducer.

The loosely installed cover portion 38 protects the base portion 17 against mechanical damage and contamination and may be removed for cleaning. However, it is not an essential part of this invention and may be either fixedly fastened to the base portion 17 or eliminated if more convenient. While it is preferred to fasten the central portions of the springs 18, 18' to the spindle 8 by the coupling sleeve 8, and to fasten the spring 18 to the bottom wall 12 by means of the screws 36 which are closer to the periphery of the spring, the two fastening arrangements may be interchanged without losing the benefits of this invention. Other variations and permutations will readily suggest themselves to those skilled in the art.

It should be understood, therefore, that the foregoing disclosure relates only to a presently preferred embodiment of the invention, and that it is intended to cover all changes and modifications of the example of the invention herein chosen for the purpose of the disclosure which do not constitute departures from the spirit and scope of the appended claims.

What is claimed is:

1. In weighing apparatus including a support, a pan carrier member, guide means on said support for guiding movement of said carrier member in a vertical direction, a weighing pan member, force transmitting means operatively interposed between said members for transmitting a force from said weighing pan member to said carrier member, said force transmitting means including a first resilient element yieldable under said force, cooperating abutment means on said weighing pan member and on said support for limiting the resilient deformation of said element by said force, transducer means connected to said carrier member and to said support for generating an electrical signal in response to said movement of said carrier member, and indicating means conductively connected to said transducer means and responsive to said signal for generating a perceptible signal indicative of said force, the improvement in said force transmitting means which comprises:
   (a) a second resilient element juxtaposed to said first resilient element in said vertical direction; and
   (b) a plurality of fastening means fastening said first and second elements to each other and to said members, in a position in which said elements and one of said members constitute parallelogram linkage means for guiding said weighing pan member in said direction during said movement of said carrier member.

2. In apparatus as set forth in claim 1, said fastening means fixedly fastening respective integral portions of said first and second elements to each other in direct contact.

3. In apparatus as set forth in claim 1, said first and second elements having each a central portion and a plurality of arm portions projecting from said central portion in angularly spaced relationship, each of said elements essentially consisting of resilient, metallic sheet material and being formed with a plurality of approximately V-shaped slots, said slots separating an inner part of each element from an outer part enveloping said inner part for relative movement of said parts in said direction, each arm portion having a circumferential, imperforate section connecting said outer and inner parts, said fastening means including first fastening means fastening the circumferential sections of said first element to corresponding circumferential sections of said second element and fastening said outer part of one of said resilient elements to said weighing pan member, and second fastening means fastening the inner part of each resilient element to said carrier member.

4. In apparatus as set forth in claim 3, said first fastening means including a plurality of lugs projecting from each element toward corresponding lugs on the other element, and welded joints connecting the corresponding lugs.

5. In apparatus as set forth in claim 3, a cover member on said weighing pan member.

6. In apparatus as set forth in claim 1, said resilient elements having each a central portion and a plurality of peripheral portions spaced from each other and from said central portion transversely of said direction, each of said peripheral portions of said first element being juxtaposed in said direction to a corresponding peripheral portion of said second element, said plurality of fastening means including first fastening means fastening the respective corresponding circumferential portions of said first and second elements to each other and to a first one of said members, and second fastening means fastening the second one of said members to one of said elements.

7. In apparatus as set forth in claim 6, said elements essentially consisting of metal, and said first fastening means including welds connecting said circumferential portions of said first and second elements.

8. In apparatus as set forth in claim 6, at least one of said elements having a plurality of arm portions projecting from said central portion of said one element in angularly offset relationship, respective parts of said arm portions constituting said circumferential portions of said one element.

9. In apparatus as set forth in claim 8, said one element essentially consisting of resilient sheet material and being formed with a plurality of approximately V-shaped slots, the V-shape of each slot having an apex in said central portion and two legs in respective arm portions of said one element, said slots separating first and second parts of said one element, said first part enveloping said second part, and said peripheral portions joining said first and second parts to each other for relative movement in said direction.

10. In apparatus as set forth in claim 9, said second fastening means fastening said second part of said one element to said carrier member.

* * * * *